United States Patent [19]

Krause et al.

[11] 4,435,093
[45] Mar. 6, 1984

[54] PYROMETER WITH SIGHTING WINDOW CLEANLINESS MONITOR

[75] Inventors: Richard H. Krause; Thomas J. Pfeiffer; Vincent V. Horvath, all of Bethlehem, Pa.

[73] Assignee: Bethlehem Steel Corporation, Bethlehem, Pa.

[21] Appl. No.: 328,769

[22] Filed: Dec. 8, 1981

[51] Int. Cl.³ ............................ G01J 5/04; G01J 5/26
[52] U.S. Cl. .................................... 374/129; 250/346; 356/43; 356/433; 374/141
[58] Field of Search ...................... 374/121, 123, 125; 356/239, 240, 43, 44, 448

[56] References Cited

U.S. PATENT DOCUMENTS

| 2,074,641 | 3/1937 | Clark | 374/125 |
|---|---|---|---|
| 3,345,873 | 10/1967 | Lellep | 374/125 |
| 3,392,623 | 7/1968 | Walker et al. | 356/239 |
| 3,463,595 | 8/1969 | Blanc et al. | 356/201 |
| 3,533,704 | 10/1970 | Krenmayr | 356/240 X |
| 3,577,784 | 5/1971 | Kovacic | 374/125 |
| 3,652,863 | 3/1972 | Gaskell et al. | 356/239 X |
| 3,693,025 | 9/1972 | Brunton | 356/440 |
| 4,081,215 | 3/1978 | Penny et al. | 374/123 |
| 4,344,819 | 8/1982 | Gerdes, Jr. | 374/142 X |
| 4,365,896 | 12/1982 | Mihalow | 356/446 |

OTHER PUBLICATIONS

A. V. Grigorev et al. "Automatic Monitoring of the Uniformity of the Coke Heating," *Coke and Chemistry, U.S.S.R.*, 1963, No. 12, pp. 14–18.

*Primary Examiner*—Daniel M. Yasich
*Attorney, Agent, or Firm*—John I. Iverson; John J. Selko

[57] ABSTRACT

Coke guide and coke oven infrared pyrometer degrading is minimized to continuously permit better accuracy and reliability in hostile environment of coke mass and heat, dust and/or dirt present in many coke plant areas. These benefits are obtained using production-worthy pyrometer equipment having a purged pyrometer with any of three window cleanliness monitors to determine errors and automatically correcting for same through self-calibration.

9 Claims, 5 Drawing Figures

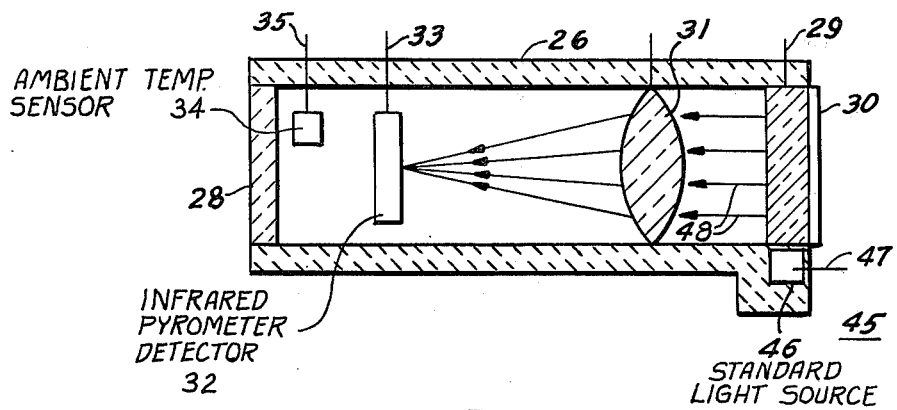
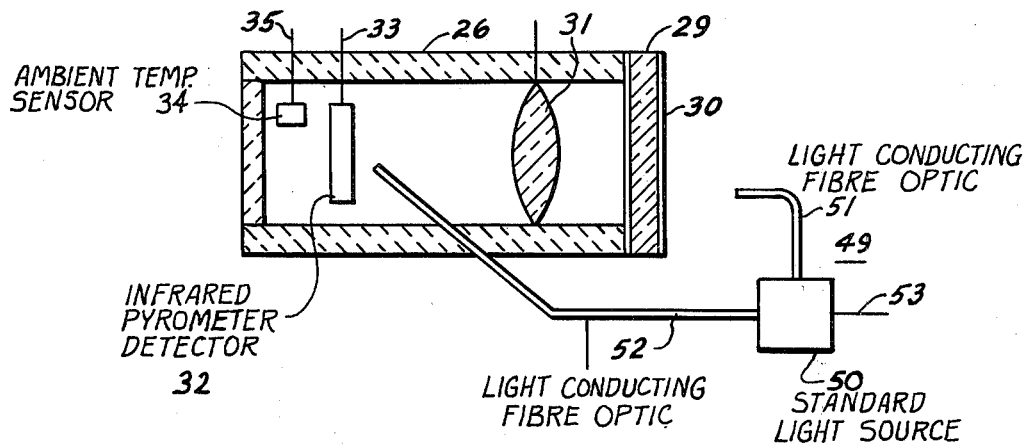

PYROMETER WITH SIGHTING WINDOW CLEANLINESS MONITOR

BACKGROUND OF THE INVENTION

This invention relates to temperature measurements taken at a coke guide or coke oven using a pyrometer with a window cleanliness monitor capable of detecting environmentally caused errors and automatically correcting same.

DESCRIPTION OF THE PRIOR ART

In batch type coke production, a door machine positions a coke guide at a selected oven, removes a coke side oven door. Then an irradiant coke mass is pushed through the coke guide into a quench car. It is important in coke production to obtain accurate and reliable temperature measurements of the coke mass continuously during coking and pushing. Accurate temperature measurements allow the operator to identify problems, maximize production, minimize pollution problems and prioritize maintenance scheduling. However, in view of the hostile environment of hot, dusty and dirty coke mass, particularly at the coke guide, the accuracy and reliability of electro-optical components, such as infrared pyrometers, become degraded. Errors can occur in the pyrometer measurements from dust and dirt buildup on the pyrometer window. Additional errors can be attributed to electronic drift resulting from high ambient temperatures.

In hostile environments where optical temperature measurements are made, many operators follow a daily practice of only occasionally cleaning pyrometer windows, either manually off-line or using an air purge, and manually recalibrating the measuring instrument in an attempt to minimize window-induced errors. Air purge failures have gone unnoticed and caused measurement errors as well as serious damage to expensive instruments. In others, such as in Assignee's copending application titled "Method of Determining Coke Level", Ser. No. 161,845, filed on June 23, 1980, now U.S. Pat. No. 4,344,819, issued Aug. 17, 1982, a lens-tipped optical fibre bundle senses the coke temperature and conducts infrared energy therethrough to a distant pyrometer in an electronic equipment enclosure. Errors arise, sometimes after only short-term operation, from heat damage, dirty sight windows and broken optical fibres suffered in the coke guide and coke oven hostile environment.

Another prior art arrangement for detecting optical instrument window cleanliness is Assignee's copending application titled "Optical Attenuation Monitor System and Method", Ser. No. 136,847, filed on Apr. 3, 1980, and now U.S. Pat. No. 4,365,896. This arrangement uses an internal reference light source projected through an optical window and any dirt on the outer surface causes reference light to be reflected inwardly as backscatter radiation. Backscatter radiation is detected as a function of dirt, and used as an error correction source. While this arrangement has many advantageous uses, it has not proved entirely satisfactory for use in the hostile environment of a coke guide because of high heat and other factors.

In some installations, electronic equipment is cooled to some extent by air purging in an endeavor to minimize drift. These, and the foregoing, prior art practices do not provide commercially available equipment with either short- or long-term solutions to accurate and reliable coke guide and coke oven temperature measurements under continuous production operating conditions.

SUMMARY OF THE INVENTION

It is an object of this invention to provide production-worthy pyrometric apparatus for continuously measuring coke temperature in the hostile environment of a coke guide and coke oven and which can minimize rate of degrading and overcome the foregoing difficulties.

Another object of this invention is to provide pyrometric apparatus for continuously measuring coke temperature in a coke guide and coke oven having improved long-term accuracy and reliability.

Yet another object of this invention is to provide pyrometric apparatus for continuously measuring coke temperature in a coke guide and coke oven which will require substantially less maintenance than heretofore.

The foregoing objects may be attained by providing production-worthy pyrometric apparatus for measuring coke temperatures in the hostile environment using an air-purged pyrometer housing, a pyrometer window cleanliness monitor for detecting environmentally-induced window optical errors, setting alarms, and automatically correcting pyrometer temperature signals for such errors. If desired, ambient temperature compensating means may be included by placing a sensor in the pyrometer housing which is connected in the pyrometer circuit means to correct the pyrometer output for variations in ambient temperature inside the housing. In addition, a pyrometer housing over-temperature detector means operates an alarm whenever an excess temperature is reached. An air conditioned electronic equipment housing maintains the electronic circuits to a predetermined temperature to avoid drift. Thus, the coke temperature signal degradation is substantially improved by providing long-term accuracy and reliability and nearly a maintenance-free setup.

BRIEF DESCRIPTION OF THE DRAWINGS

FIG. 4 is a schematic cross section of a second embodiment of window cleanliness monitor assembly useable in FIG. 3 pyrometer head.

FIG. 5 is a schematic cross section of a third embodiment of window cleanliness monitor assembly useable in FIG. 3 pyrometer head.

DESCRIPTION OF THE PREFERRED EMBODIMENTS

Figure 1:
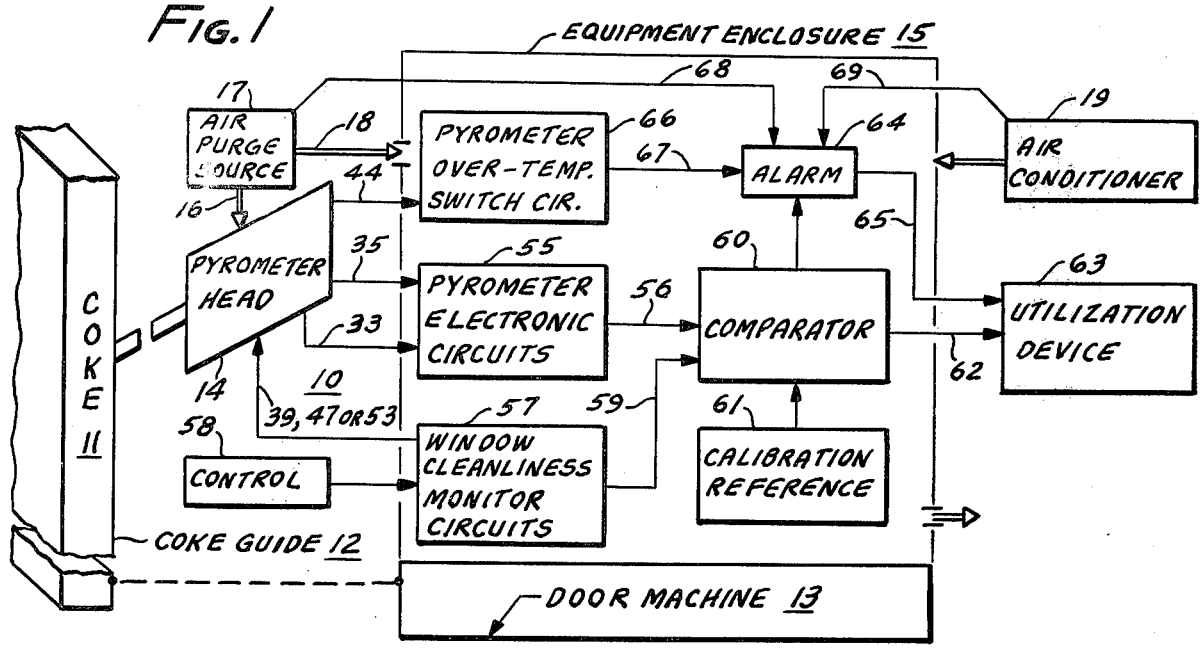
FIG. 1 is a block diagram of the pyrometric apparatus of this invention illustrated installed on a coke guide and an interconnected door machine.

Referring now to the drawings, FIGS. 1 to 5 and FIG. 1 in particular, production-worthy pryometer apparatus 10 of this invention is shown, for example, installed on the coke side of a selected coke oven in a coke oven battery. When ready, irradiant coke 11, which is an irradiant mass at a high temperature at approx. 1093° C. (2000° F.), is pushed by pusher means (not shown) through coke guide 12 and into a quench car (not shown). Coke guide 12 is positioned at the coke side of the selected oven site by door machine 13 after first removing the coke side oven door. Because uniform vertical and horizontal coke temperatures along the length of the individual ovens is an important coke making parameter, it is of great importance that coke temperature at coke guide 12, or elsewhere, be continuously obtained on an accurate and reliable basis. Otherwise, the entire coke making process control will suffer, along with coke quality, operating and maintenance cost, and ultimate profitability.

Accordingly, production-worthy pyrometer apparatus 10 is provided with pyrometer head 14 mounted on coke guide 12 and associated electronic circuit means, including means for self-calibrating the coke temperature signal, all contained in equipment enclosure 15 mounted on door machine 13 with interconnecting electronic and pneumatic services described below. Devices 14,15 are constructed of materials suitable to resist their respective hostile environments. Pyrometer head 14 has a housing purged of dust and dirt and is cooled to some extent by air on line 16 from air purge source 17 carried on door machine 13. Similarly, equipment enclosure 15 has a housing also purged of dust and dirt and cooled to a limited extent by air on line 18 from source 17. When the electronic circuits inside equipment enclosure 15 are heat sensitive and/or tend to drift beyond the cooling capabilities suppled from air line 18, then air conditioner 19 of sufficient capacity may, if desired, be substituted for the cooling source from air line 18.

Figure 2:
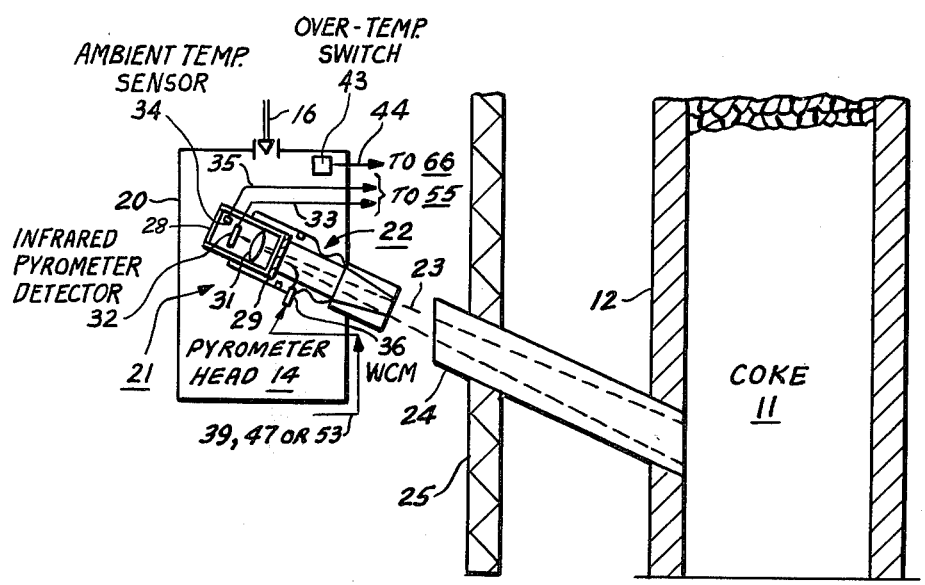
FIG. 2 is a schematic cross section of a coke guide showing a pryometer head positioned at a sight tube.
Figure 3:
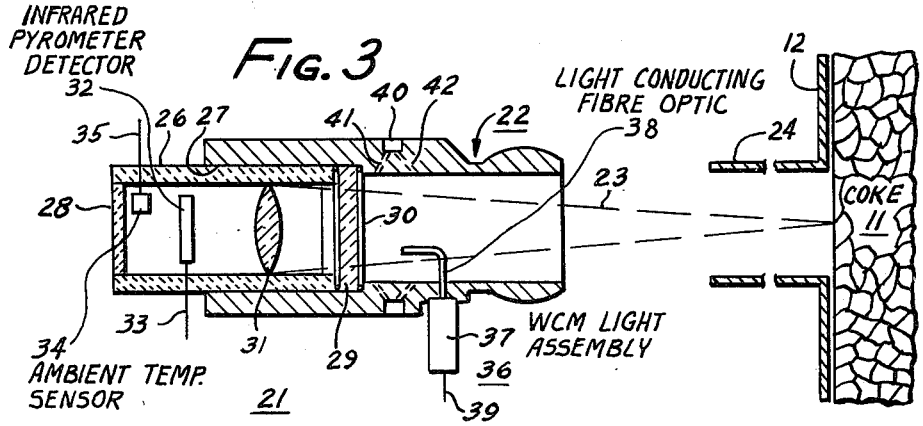
FIG. 3 is a schematic cross section of a pyrometer head with a first embodiment of window cleanliness monitor assembly of this invention.

As shown in FIGS. 2,3, pyrometer head 14 includes a pyrometer housing 20, which is resistant to hostile environmental elements and purged by air line 16 from source 17, an optical pyrometer assembly 21 in housing 20, tubular adjustable mount 22 for aiming pyrometer assembly 21 to pick up irradiant coke image 23 through sight tube 24. Sight tube 24 is located between pollution barrier 25 and an outer wall of coke guide 12 which form part of the entire structure of door machine 13. Included in pyrometer assembly 21 is a tubular housing 26 adapted to be slip-fitted into tubular opening 27 of adjustable mount 22. Tubular housing 26 is closed at end 28, includes coke sighting window 29 made of quartz glass at the opposite end which is subject to optical error by hostile environment matter 30, such as a dirt film buildup. Also included in pyrometer assembly 21, within tubular housing 26, are lens 31 for focusing irradiant coke image on an infrared pyrometer detector 32 which generates a coke temperature signal on line 33, and pyrometer 26 ambient temperature sensor 34, such as a posistor device, which generates a pyrometer ambient temperature signal on line 35.

Pyrometer assembly 21, in addition, is provided with window cleanliness monitor (WCM) means 36 having a preferred embodiment shown in FIG. 3. WCM means 36 has a WCM light assembly 37 with a stable source of light which is transmitted through light conducting fibre optic 38. Light conducting fibre optic 38 has an end outside coke sighting window 29 aimed toward pyrometer detector 32 inside housing 26. The stable light source inside monitor light assembly 37 is turned on by a WCM control signal on line 39 to determine the amount of window optical error introduced in the coke temperature signal on line 33 caused by the build up of dirt film 30 on coke sighting window 29 and similar matter on the end of fibre optic 38. When the WCM control signal is turned off, such as during normal pyrometer operation, the WCM ceases to function.

Also included in adjustable mount 22 is an air purge manifold 40 encircling the tubular portion of mount 22 with a first plurality of air purge jets 41 directed toward dirt film 30 on window 29. A second set of air purge jets 42 is aimed in the end direction of WCM light conducting fibre optic 38. The combined effect of air purge jets 41,42 tends to minimize dirt from entering pyrometer mount 22. In addition, an air wiping effect tends to clean equally the dirt film 30 from coke sighting window 29 and from the end of fibre optic 38.

Inside pyrometer housing 20 is over-temperature switch 43 which generates an over-temperature signal on line 44 whenever the ambient temperature inside housing 20 approaches a temperature which will cause permanent damage to electronics components therein, such as damage to detector 32 and sensor 34.

In addition to the preferred WCM embodiment shown in FIG. 3, FIGS. 4,5 show two alternative embodiments of WCM for detecting the window optical error caused by dirt film 30 building upon coke sensing window 29.

FIG. 4 shows a second WCM means 45 having a second standard light source 46, such as a light emitting diode (LED) or a laser, positioned to edge light coke sighting window 29 when turned on by a WCM control signal on line 47. Back scatter light 48 is generated and imaged on pyrometer detector 32 proportional to the amount the edge lighting is reflected from dirt film 30. This back scattered light is a direct function of window 29 optical error effect on coke temperature signal on line 33. When the WCM second control signal on line 47 is turned off, such as during normal pyrometer operation, the second WCM ceases to function.

FIG. 5 shows a third WCM means 49 having a third standard light source assembly 50 of the same type as in the preferred embodiment WCM means 37. Light source assembly 50 includes an electro-optical switch for alternately directing WCM light to a standard light source fibre optic 51 located outside window 29 and aimed through dirt film 30 to pyrometer detector 32, and then to a reference light source fibre optic 52 which is aimed directly on to pyrometer detector 32. The alternating standard and reference light sources of respective fibre optics 51,52 is turned on by a third WCM control signal on line 53 to detect the effects of window optical error caused by dirt film 30 on the coke temperature signal on line 33. Because of its ratioing effect, the alternating WCM lighting scheme when turned on is unaffected by variations in the wavelength or intensity of source 50. When the WCM third control signal on line 53 is turned off, such as during normal pyrometer operation, the third WCM ceases to function.

Referring back to FIG. 1, the circuit means shown in equipment enclosure 15, may be individual hardwired circuits as shown, or one or more may be incorporated in a microcomputer (not shown) programmed to perform the same processing, correction and self-diagnostic functions as shown and described herein.

Pyrometer head 14 outputs a coke temperature signal on line 33 which is susceptible to two forms of errors, namely, pyrometer ambient temperature drift error and window optical error. The coke temperature signal on line 33 is fed to pyrometer electronic circuits 55 which include conventional linearizing and scaling circuits for accommodating the characteristics of coke temperature sensing infrared optical pyrometer detector 32 (shown in FIGS. 2,3,4,5). Pyrometer electronic circuits 55 are modified to correct for pyrometer ambient temperature drift as a function of pyrometer ambient temperature signal received on line 35, thereby outputting a drift corrected coke temperature signal on line 56.

Equipment enclosure 15 includes window cleanliness monitor circuits 57, which in response to an external control device 58, produce and output the first, second or third WCM control signal on lines 39, 47 or 53, respectively, to either the window cleanliness monitor light assemblies 37, 46 or 50, described above in connection with pyrometer head 14 shown in FIGS. 2 to 5. Before making the coke temperature measurements, either of the first, second or third WCM control signals on lines 39, 47 or 53 and corresponding WCM light source are turned on and off by control device 58 before coke 11 is pushed through coke guide 12. When the WCM control signal is on, pyrometer detector 32 alternately receives WCM light and initiates a drift-corrected WCM temperature signal on line 56, but when this signal is off and coke 1 is pushed through coke guide 12 a drift corrected coke temperature signal will regularly be on line 56. This procedure establishes a basis for detecting the amount of optical error in a drift-corrected coke temperature signal on line 56 which is caused by dirt film 30 on coke sighting window 29. A digital WCM on-off test signal is also output from control device 58 on line 59 during the WCM control signal on-off periods.

The drift-corrected WCM or coke temperature signals alternately on line 56 and the digital on-off WCM test signal on line 59 are fed to dual-purpose comparator 60. First, when the WCM off-on test signal is on at line 59, the comparator 60 compares alternate drift-corrected WCM temperature signal against a preset calibration reference signal from source 61 representing a clean window 29. Comparator 60 divides the drift-corrected coke temperature signal by the calibration reference signal and develops an optical correction factor which is stored whenever the digital on-off WCM test signal is off at line 59. Second, comparator 60 automatically corrects subsequent drift-corrected coke temperature signals according to the stored optical correction factor through a self-calibration procedure. Each automatically self-calibrated coke temperature signal is output on line 62 to utilization device 63, such as a coke temperature indicator, signal processor, or a computer.

Self-diagnostic limit checks of coke temperature signal correction are also tested in comparator 60 against the calibration reference signal from source 61. When coke temperature signal correction can no longer be made, either above or below the calibration reference signal, alarm 64 is activated by comparator 60 and this condition is fed over alarm line 65 to utilization device 63. Another self-diagnostic check is made when over-temperature sensor 43 in pyrometer housing 20 generates a signal on line 44, the signal is fed to pyrometer over-temperature switch circuit 66 which outputs a signal on line 67 signifying a condition that the housing temperature has reached its safe limit. The over-temperature signal condition on line 67 also activates alarm 64 and utilization device 63 and alerts the user that damage to the electronic components is probable. In still another self-diagnostic check, alarm 64 is activated, as is utilization device 63, whenever a loss of purge air source 17 causes a contact closure to occur on line 68, or whenever a loss of air conditioning from source 19 causes a contact closure to occur on line 69.

We claim:

1. Apparatus for measuring temperature of a high temperature irradiant mass, said apparatus comprising:
   (a) pyrometer means for measuring temperature of said irradiant mass including:
      (i) a first housing closed at one end and having a sighting window at an opposite end, said sighting window having an outside surface subject to environmental matter;
      (ii) pyrometer detector means within said first housing for producing a signal which varies proportional to the irradiant mass temperature and an optical error induced by the environmental matter on said outside surface of said sighting window;
      (iii) lens means within said first housing for focusing an irradiant image of said irradiant mass on said pyrometer detector means; and
      (iv) said first housing fitted within an adjustable mount in a second housing,
   (b) sighting window cleanliness monitor means for detecting sighting window cleanliness including:
      (i) monitor light assembly means for generating a stable source of light;
      (ii) first light conducting fibre optic means within said second housing and outside said sighting window for transmitting light from said monitor light assembly means first through the environmental matter on said outside surface and thereafter through said sighting window into said pyrometer detector means; and
   (c) circuit means with means for indicating the need for correcting the irradiant mass temperature signals from said pyrometer detector means due to optical error induced by the environmental matter on said outside surface of said sighting window.

2. The invention of claim 1 wherein said circuit means (c) includes:
   (a) pyrometer circuit means for response to the irradiant mass temperature and light from said monitor light assembly means;
   (b) sighting window cleanliness monitor circuit means for producing said stable source of light in response to a monitor light control signal from said monitor light assembly means; and
   (c) comparator circuit means for comparing (i) a preset calibration signal and (ii) a pyrometer circuit means signal from said light from said sighting window cleanliness monitor circuit means.

3. The invention of claim 2 wherein said monitor light assembly means includes a second light conducting fibre optic means within said first housing for transmitting a reference light representing a clean sighting window directly into said pyrometer detector means.

4. The invention of claim 3 wherein said monitor light assembly means includes an electro-optical switch for alternately selecting said first or second light conducting fibre optic means.

5. The invention of claim 4 wherein said comparator circuit means compares a pyrometer circuit means signal from (i) said first light conducting fibre optic means and (ii) said second light conducting fibre optic means.

6. The invention of claim 2 wherein said pyrometer means includes means for compensating signals from pyrometer detector means for ambient temperature.

7. The invention of claim 1 wherein said second housing is air purged or, if desired, air conditioned.

8. The apparatus of claim 1 wherein said circuit means (c) includes an equipment enclosure for said circuit means (c) which is air purged or, if desired, air conditioned.

9. The invention of claim 2 wherein said comparator circuit means compares a pyrometer circuit means signal from (i) a preset calibration signal and (ii) an irradiant mass temperature.

* * * * *